3,152,239
SOLDERING TOOL
Henry A. Faulconer, % Falcon Laboratories,
P.O. Box 386, Descanso, Calif.
Filed Feb. 12, 1963, Ser. No. 257,937
4 Claims. (Cl. 219—234)

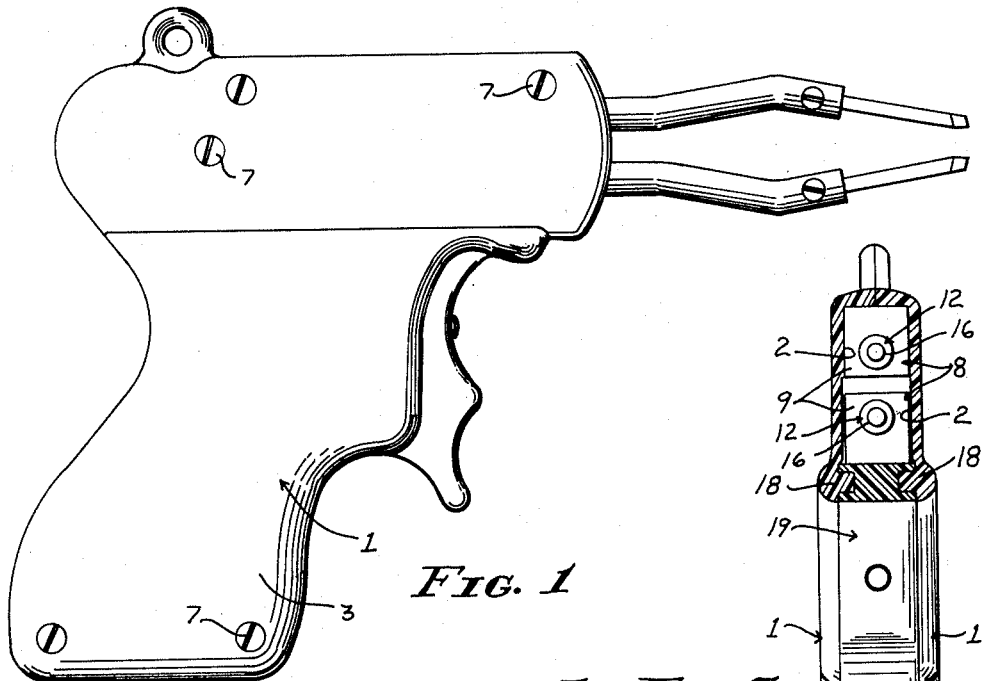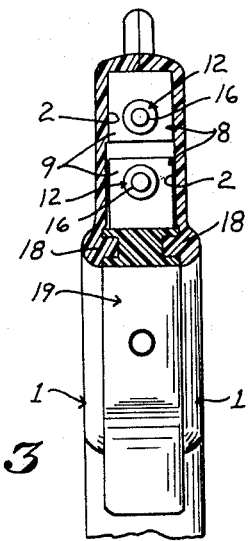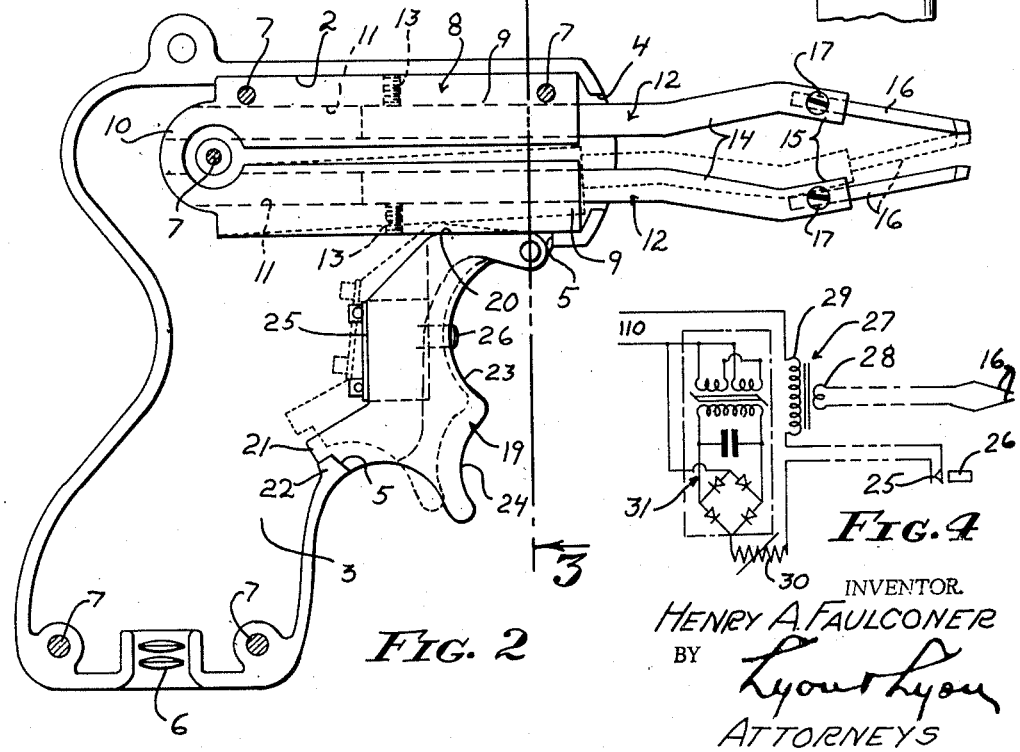

This invention relates to soldering tools, and included in the objects of this invention are:

First, to provide a soldering tool which includes a pistol grip handle having a trigger member operable to move a pair of electrodes to and from each other to grip a workpiece, and a manually operable switch incorporated in the trigger, the electrodes being connected to a low voltage secondary coil of a transformer whereas the switch is connected to the primary thereof, said switch being operable independently of the clamping action of said electrodes so that after the soldering operation the work may be clamped until the solder has hardened.

Second, to provide a soldering tool which incorporates means whereby the electrical output may be varied over a wide range, so that the soldering tool may be used for joining delicate electronic elements or rugged components requiring heavy current, and which is so arranged as to minimize transient current surges which might adversely affect delicate circuits associated with the work clamped between the electrodes.

With the above and other objects in view, as may appear hereinafter, reference is directed to the accompanying drawings in which:

FIGURE 1 is a side view of the soldering tool;

FIGURE 2 is a similar view with one of the complementary housing members removed to expose the internal mechanism;

FIGURE 3 is a sectional view taken through 3—3 of FIGURE 2;

FIGURE 4 is a circuit diagram showing the manner in which the soldering tool is energized.

The soldering tool includes a pair of complementary housing members 1, the upper portions of which form an electrode holder body cavity 2 of essentially rectangular proportions. Depending from this portion of the housing members 1 is a pistol grip 3, shaped so as to be readily gripped by one's hand.

The housing members 1 are provided at the forward extremity of the cavity 2 with an electrode holder slot 4. The pistol grip portion 3 is provided at its upper forward side with a trigger slot 5. The bottom extremity of the pistol grip portion 3 is provided with a cord-receiving opening 6. The two housing members are joined together by appropriately located connecting screws 7.

Mounted within the cavity 2 is an electrode holder mounting body 8. This member is U-shaped, and preferably formed of insulating material capable of withstanding moderately elevated temperatures.

The mounting body 8 includes two parallel legs 9 and a connecting web 10. The connecting web has limited flexibility so that the extremities of the legs 9 may be moved relatively to and from each other. One of the legs is secured in the upper portion of the cavity 2 by means of a pair of the connecting screws 7. The other or lower leg is free to pivot within the cavity 2, but is held by the wall of the cavity against appreciable lateral displacement.

The legs 9 are provided with longitudinal bores 11 which receive electrode holder bars 12 secured in place by set screws 13. The bars 12 are formed of metal having high conductivity and project from the legs 9 through the slot 4. Beyond the slot 4 the bars 12 are bent to form outwardly diverging portions 14, the extremities of which are bent in to form converging tip portions 15. The tip portions 15 are provided with sockets which receive electrodes 16.

The electrodes 16 are preferably square in cross section, and are formed of tungsten carbide, or other heat-resisting metal, which also has the property that it is not readily wetted by solder. The holder bars 12 are so formed and the electrodes 16 are so proportioned that they may be moved between a spaced relationship, as shown by solid lines in FIGURE 2, and a mutually contacting relationship, as indicated partially by dotted lines in FIGURE 2. The electrodes 16 are held in place by set screws 17.

Immediately under the cavity 2, within the trigger slot 5, the housing members 1 are provided with coaxial journal pins or bosses 18 which project toward each other. Pivotally mounted at one end by the journal pins is a trigger 19. The trigger 19 extends from the journal pins underneath the lowermost holder bar 12 to form a lever arm 20, which may be pivoted upwardly to force the under electrode 16 into contact with the upper electrode 16, as viewed in FIGURE 2. The flexible connecting web 10 resists this movement so that the electrodes 16 normally occupy the spaced relation shown by solid lines in FIGURES 1 and 2. The biasing force of the connecting web 10 may be augmented by an appropriately located spring, not shown.

The trigger 19 extends downwardly from its lever arm 20 to fill the trigger slot 5, and its lower extremity is provided with a stop 21 which engages a reinforced shoulder 22 provided at the lower extremity of the trigger slot 5. The forward side of the trigger 19 is provided with a pair of finger-receiving recesses 23 and 24.

The back or inner side of the trigger 19 is recessed to receive a conventional switch 25 having a push pin 26 which extends into the uppermost finger recess 23. The switch 25 is preferably of the type which requires only slight movement to open or close a circuit therethrough, so that the push pin 26 need project only a superficial distance into the finger recess.

The finger recesses 23 and 24 are intended to receive the forefinger and middle finger of the user's hand, whereas the portion of the pistol grip 3 projecting below the trigger 19 receives the remaining two fingers of the user's hand.

A transformer 27 is provided which includes a low voltage secondary 28 and a high voltage primary 29. That is, the primary side of the transformer is intended for connection to a conventional 110 volt supply, whereas the secondary 28 is designed to produce high current at low voltage; for example, in the range of ½ volt to 3 or 4 volts. The secondary is connected through a suitable cord adapted to carry substantial current to the electrode holder bars 12. The primary is connected through a second cord to the switch 25.

It is preferred to incorporate in the primary circuit a variable resistance 30 and a saturable reactor 31 so that the voltage across the electrodes 16 may be regulated, and also to prevent voltage surges when contact is made between the electrodes 16.

Operation of the soldering tool is as follows:

The members to be joined by solder are gripped between the electrodes 16 by squeezing the trigger 19. Initially, this is done without operating the switch 25. When the members are properly held, the switch 25 is closed so that current flows through the members, heating the members to the melting temperature of the solder. Solder is applied, and, when the members to be soldered are properly coated, the switch 25 is opened without, however, releasing the electrodes 16, until the solder has hardened.

By adjustment of the variable resistance 30, the voltage across the electrodes 16 may be controlled so that the soldering tool may be used on delicate electric or electronic elements which would be damaged by high current or excess voltages, yet higher voltage and much heavier current may be used for soldering more rugged devices.

The saturable reactor unit 31 prevents power surges between the electrodes 16 and through the members to be joined and associated elements. This is particularly important when the soldering tool is used for connecting electronic components.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:
1. A soldering tool, comprising:
 (a) an electrode holder body member including a pair of legs relatively movable to and from each other;
 (b) electrode holders secured therein and extending from said legs;
 (c) electrodes carried by said holders for movement to and from each other;
 (d) a housing structure encasing said body member and having a pistol grip portion depending therefrom;
 (e) a trigger pivotally mounted in said pistol grip portion and including a portion engageable with one of the legs of said body member to move said electrodes toward each other, and a plurality of finger recesses exposed at the forward side of said pistol grip portion;
 (f) a switch carried by said trigger having a manually operable element extending into one of said recesses and movable independently of the trigger;
 (g) and a transformer having a secondary connected with said electrodes and a primary connected with said switch.

2. A soldering tool, comprising:
 (a) a housing structure;
 (b) a pair of electrode holders disposed in said housing and terminating in electrodes projecting from said housing structure, one of said electrodes being mounted in said housing for movement to and from engagement with the other electrode;
 (c) yieldable means tending to separate said electrodes;
 (d) said housing structure including a pistol grip handle below said electrode holders;
 (e) a trigger pivotally mounted in said pistol grip handle including means operatively connected with one of said electrode holders for moving said electrode toward engagement with the other electrode;
 (f) and a switch carried by said trigger and including means projecting from said trigger and manually operable independently of movement of said trigger to complete an electrical circuit through said electrodes.

3. A soldering tool, comprising:
 (a) a housing structure;
 (b) a pair of electrode holders disposed in said housing and terminating in electrodes projecting from said housing structure, one of said electrodes being mounted in said housing for movement to and from engagement with the other electrode;
 (c) yieldable means tending to separate said electrodes;
 (d) said housing structure including a pistol grip handle below said electrode holders;
 (e) a trigger pivotally mounted in said pistol grip handle including means operatively connected with one of said electrode holders for moving said electrode toward engagement with the other electrode;
 (f) a switch carried by said trigger and including means projecting from said trigger and manually operable independently of movement of said trigger;
 (g) and a transformer having a low voltage secondary connected with said electrodes, and a high voltage primary controlled by said switch.

4. A soldering tool as set forth in claim 3, wherein:
 (a) a saturable reactor is disposed in series with said switch and transformer primary to minimize current or voltage surges through said electrodes on closing of the electrical circuit therethrough.

References Cited in the file of this patent
UNITED STATES PATENTS

| | | |
|---|---|---|
| 2,454,338 | Pityo et al. | Nov. 23, 1948 |
| 2,462,458 | Beymer | Feb. 22, 1949 |
| 2,517,653 | Gaston | Aug. 8, 1950 |
| 2,605,379 | McKay | July 29, 1952 |
| 3,050,618 | Fischer | Aug. 21, 1962 |

FOREIGN PATENTS

| | | |
|---|---|---|
| 556,835 | Great Britain | Oct. 25, 1943 |
| 567,944 | Italy | Oct. 17, 1957 |